(12) United States Patent
Alexandru

(10) Patent No.: US 6,484,191 B1
(45) Date of Patent: Nov. 19, 2002

(54) APPARATUS AND METHOD FOR THE REAL-TIME CALCULATION OF LOCAL VARIANCE IN IMAGES

(75) Inventor: Radu Alexandru, Cheshire, CT (US)

(73) Assignee: Aloka Co., Ltd. (JP)

( * ) Notice: Subject to any disclaimer, the term of this patent is extended or adjusted under 35 U.S.C. 154(b) by 0 days.

(21) Appl. No.: 09/346,599

(22) Filed: Jul. 2, 1999

(51) Int. Cl.$^7$ .............................. G06F 7/00; G06F 15/00
(52) U.S. Cl. ....................................... 708/200; 702/179
(58) Field of Search .............................. 708/200, 202, 708/304, 308, 445; 702/179

(56) References Cited

U.S. PATENT DOCUMENTS

| | | | |
|---|---|---|---|
| 5,081,692 A | * | 1/1992 | Kwon et al. |
| 5,186,175 A | | 2/1993 | Hirama et al. |
| 5,479,926 A | | 1/1996 | Ustuner et al. |
| 5,579,431 A | * | 11/1996 | Reaves ........................ 704/214 |
| 5,664,572 A | | 9/1997 | Kishimoto |
| 5,779,641 A | | 7/1998 | Hatfield et al. |
| 5,793,883 A | | 8/1998 | Kim et al. |
| 5,865,752 A | | 2/1999 | Seyed-Bolorforosh et al. |
| 5,873,830 A | | 2/1999 | Hossack et al. |

* cited by examiner

Primary Examiner—Chuong Dinh Ngo
(74) Attorney, Agent, or Firm—Cantor Colburn LLP

(57) ABSTRACT

An apparatus (78) for the real-time calculation of local variance in an array of digital signals includes a first squaring device (80) arranged to receive an input signal, the input signal being one of a plurality of signals within a window defined in the array. The first squaring device (80) squares the value indicated by the input signal and provides a signal indicative of the squared value to a first recursive sum device (84). The first recursive sum device (84) uses a recursive sum method to calculate the sum of the squares of a plurality of values indicated by the plurality of digital signals. The input signal is also received by a second recursive sum device (86). The second recursive sum device (86) uses a recursive sum method to calculate the sum of the plurality of values. The second recursive sum device (86) outputs a signal indicative of this sum to a second squaring device (82), which, in turn, provides a signal to a first dividing device (88). The signal output from the first dividing device (88) is indicative of the square of the sum of the plurality of values in the window, divided by the number of digital signals in the window. In the first subtracting device (94), this value is subtracted from the value indicated by the signal from the first recursive sum device (84). Finally, in the second dividing device (92), the value indicated by the signal from the first subtracting device (94) is divided by the number of digital signals in the window. The resulting value is the variance for the plurality of values. A signal indicative of this value is output from the second dividing device (94).

14 Claims, 7 Drawing Sheets

APPARATUS AND METHOD FOR THE REAL-TIME CALCULATION OF LOCAL VARIANCE IN IMAGES

FIELD OF THE INVENTION

This invention relates to the field of image processing, and in particular to the calculation of local variance in coherent images such as ultrasound images used in medical and non-destructive testing applications.

BACKGROUND OF THE INVENTION

Ultrasound imaging systems for medical diagnostics scan a subject with ultrasound beams in a sector or rectangular shape and provide a two-dimensional display of the scanned field. The imaging system includes a transducer that emits and focuses the ultrasound beams along certain linear directions (scan lines). The emitted beams are refracted, absorbed, dispersed and reflected within the target subject. Those beams that are reflected back to the transducer are converted to analog electrical signals. These signals undergo a number of processing steps such as filtering, amplification, analog to digital conversion, beamforming, and demodulation. These processing steps produce a two-dimensional array of digital data representative of the acoustic properties of the material at various points in the scanning field. This array is then processed by image processing circuitry. The image processing circuitry removes imperfections and improves the desired features of the image. The image processing circuitry also encodes the beam-formed formed data into picture elements (pixels). The pixels are then converted to an analog signal for output to a viewing device, such as a CRT monitor. The resulting B-mode image (brightness image) is a gray scale image in which the range of darker-to-lighter gray-scale shades correspond to increasing strength of the reflected signal (echo).

An ultrasound image contains innumerable imperfections including electronic and acoustic noise, misplaced information due to refraction and scatter of ultrasound beams and, under some circumstances, gaps in the image which contain no genuine ultrasound information. Several types of image processing methods have been devised to manipulate the digital data, permitting improvement in the final displayed image. In some image processing methods—such as filtering for speckle reduction in ultrasound images—it is necessary to calculate various local statistical characteristics at each datum in the image. Local statistical characteristics are those statistical characteristics calculated using the data contained in a rectangular window around the sample of interest, as opposed to global characteristics which are calculated using all the data in the array.

Two of the most common local characteristics used in image processing applications are the mean and the variance, defined mathematically by the formulas:

$$MEAN_{n,m} = \frac{1}{H*V} \sum_{p=0}^{V-1} \sum_{q=0}^{H-1} S_{n+p,m+q} \quad (1)$$

$$VAR_{n,m} = \frac{1}{H*V} \sum_{p=0}^{V-1} \sum_{q=0}^{H-1} (S_{n+p,m+q} - MEAN_{n,m})^2 \quad (2)$$

Where, as described for FIG. 1, "H" and "V" are the horizontal and vertical size (in samples) of the rectangular window in which the statistics are calculated, "n" and "m" are the line (vertical) and column (horizontal) indexes of the origin of the window relative to the origin of the array, "p" and "q" are the vertical and horizontal position indexes relative to the window origin, and $S_{ij}$ is the sample at position (ij).

Typically these characteristics are calculated sequentially for every sample $S_{ij}$ in the image, starting at the origin of the image (j=0,i=0) then moving the window one sample position at a time in the line ("j") direction until the local characteristics are calculated for every sample in the line. The window is then returned to the start of the lines (j=0) and moved down one position in the column direction ("i") to begin calculating the local characteristics for every sample in the next line. This pattern is repeated until the local characteristics are calculated for every sample in the image.

The characteristics have to be calculated in 'real-time'. In other words, the characteristics have to be calculated at the same rate that the samples are generated in order to display typically several tens of images per second. Since the number of samples in each image is generally large (tens or hundreds of thousands), the real-time sample rate tends to be high, on the order of tens of millions per second. This leads to a large computational load for the apparatus used to compute the local characteristics. In order to keep the cost of the apparatus reasonably low, it is necessary to devise methods to calculate the characteristics with as few and as simple operations as possible.

Unfortunately, with the aforementioned algorithm, the direct calculation of the mean using formula (1) requires H*V−1 additions, and the direct calculation of the variance using formula (2) requires H*V−1 additions, H*V subtractions and H*V squaring operations; for example, if H=V= 10, direct calculation of the mean would require 99 additions and the direct calculation of the variance would require 199 addition/subtractions and 100 squarings. Because these calculations have to be performed for each sample in the image, the direct calculation of mean and variance cannot be performed in real-time at a reasonable cost with the current technology.

Recursive sum algorithms are known and have been used for a long time for reducing the number of computations necessary to calculate the local mean. In these algorithms the window is moved over the array one sample position at a time and the sum of samples for the new window position is calculated from the sum of the previous position by subtracting the samples which drop out of the window and adding the new samples which enter the window. No calculations are needed for the samples belonging to both the old and the new window position. Therefore, only two additions and two subtractions per window position are performed for a 2-dimensional window of any size—a considerable saving when compared with the 99 additions for the 10 by 10 window in example above.

However, it is not possible to directly implement the recursive sum algorithms to the calculation of local variance using formula (2). This is because, in formula (2), all terms in the summation $$\left( \sum_{p=0}^{V-1} \sum_{q=0}^{H-1} (S_{n+p,m+q} - MEAN_{n,m})^2 \right)$$

change with every change in the window position. All the terms depend not only on the values of the samples in the window, but also on the mean, which changes with the window position.

BRIEF SUMMARY OF THE INVENTION

The above-discussed and other drawbacks and deficiencies of the prior art are overcome or alleviated by the apparatus and method for the real-time calculation of local variance in images of the present invention. In an exemplary embodiment, a method of calculating local variance in an array of digital signals includes defining a window for moving within the array of digital signals, with the window having a size to include at least two digital signals. First, the window is moved to a first position where the window includes first and second digital signals, with the first and second digital signals indicative of first and second values. At this first position, the first and second values are added to obtain a first sum. The square of the first and second values are also added to obtain a second sum. A variance value is then determined for the first window position using the window size, the first sum, and the second sum. Next, the window is moved to a second position where the window includes the second digital signal and a third digital signal, with the second digital signal indicative of the second value and the third digital signal indicative of a third value. At the second position, the first sum and the third value are added, then the first value is subtracted to obtain a third sum. The second sum and the square of the third sum are added, then the square of the first sum is subtracted to obtain a fourth sum. Finally, a variance value for the second window is determined using the window size, the third sum and the fourth sum.

In an alternate embodiment, the method of calculating local variance in an array of digital signals includes defining a window for moving within an array of digital signals, with the window having a size to include at least two digital signals. A plurality of values indicated by a plurality of signals within the window are recursively summed to obtain a first window sum. The plurality of values within the window are squared, and the squares of the plurality of values are recursively summed to obtain a second window sum. The first and second window sums are then used to determine a variance value for the window position. The variance value is determined by, first, dividing the square of the first window sum by the size of the window to obtain a first interim value. Next, the first interim value is subtracted from the second window sum to obtain a second interim value. Finally, the second interim value is divided by the size of the window to obtain the variance value for the window position.

BRIEF DESCRIPTION OF THE DRAWINGS

Referring now to the drawings wherein like elements are numbered alike in the several FIGURES.

DETAILED DESCRIPTION OF THE INVENTION

An apparatus and method for the real-time calculation of local variance in images (referred to as the "variance calculating circuit" and "variance calculating method", respectively) are described herein, by way of example, as being incorporated in the image processing subsystem of an ultrasound scanner. However, one skilled in the art will see that the variance calculating circuit and variance calculating method described herein can also be incorporated in any data processing system, device, or software program in which it is necessary to calculate the local variance around each member of a data array (single or multi-dimensional).

Figure 1:
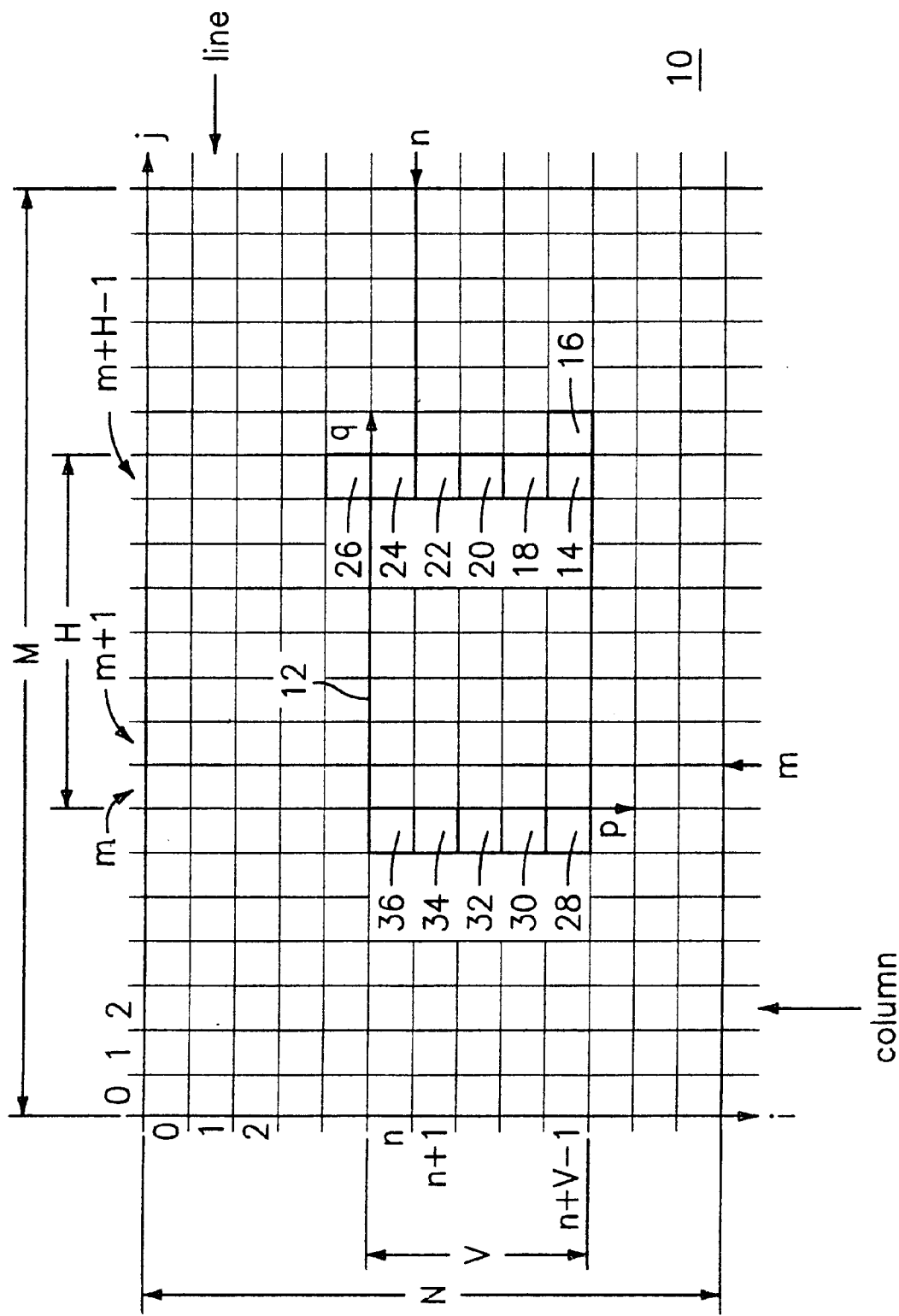
FIG. 1 is a graphical representation of a 2-dimensional array representing the data collected for a given transducer target area.

FIG. 1 is a 2-dimensional array (image), generally designated 10, representing, for example, data collected in an ultrasound imaging system (not shown) for a given transducer target area. Each element of array 10 is a digital signal indicative of the echo intensity for a point in the transducer target area. The elements of array 10 are hereinafter referred to as "samples", and a sample at a point (i, j) in array 10 is hereinafter referred to as "$S_{ij}$". Image 10 is arranged with "N" lines of samples extending in the horizontal direction, "j", and "M" columns of data samples that extend in the vertical direction, "i". In image 10, "m" and "n" represent points along the "j" and "i" axes, respectively.

Image 10 includes a window 12 defined therein for moving within the array of digital signals. Window 12, located at origin (n, m), includes the samples to be used in calculating the local variance for that window position. In other words, the local variance of window 12 at origin (n, m) is calculated using the values for the H*V samples in the window, where "H" is the horizontal size of the window (in samples), V is the vertical size of the window (in samples), and H*V is the size of the window (in samples). The term "size", as used herein, indicates a number of samples.

Figure 2:
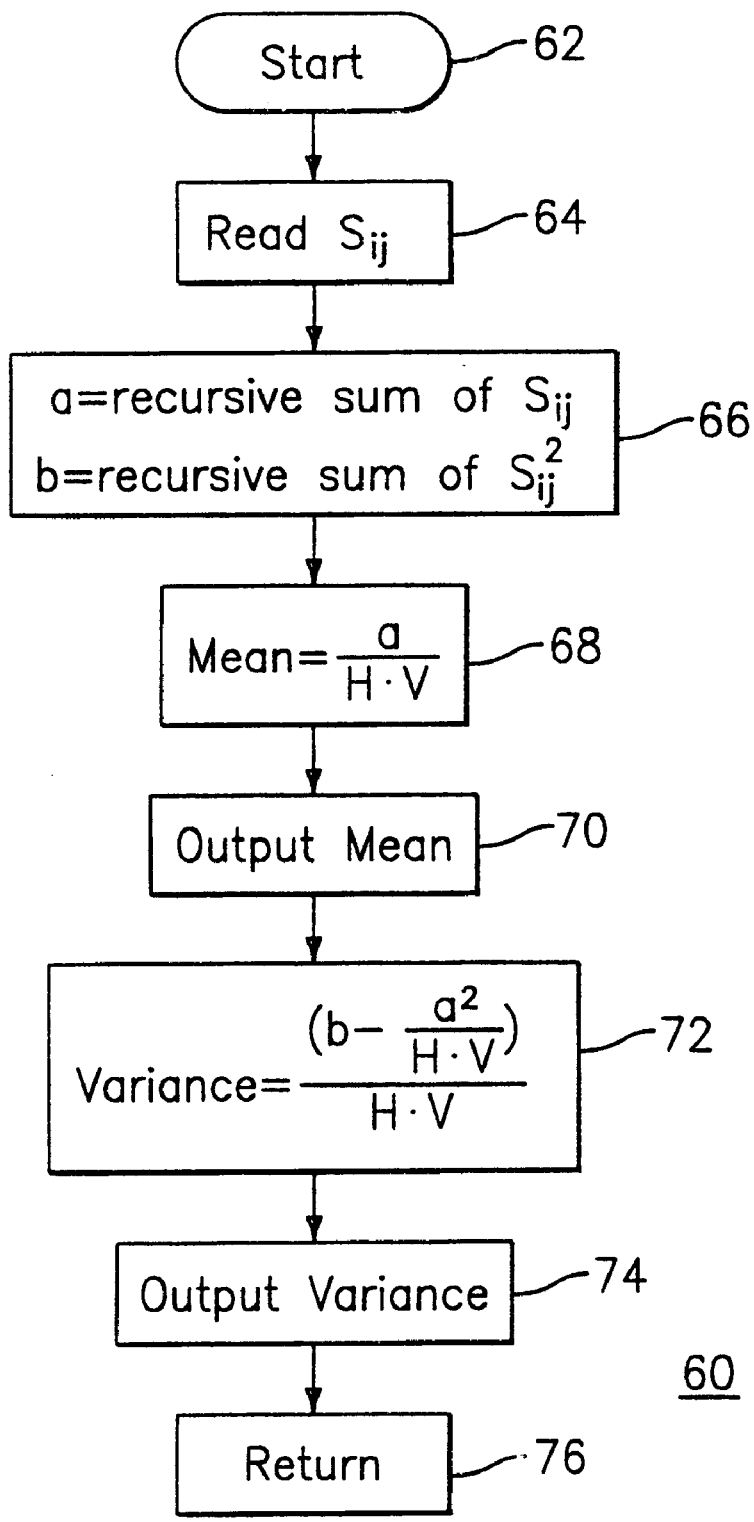
FIG. 2 is a graphical representation of a local variance and local mean calculation method of the present invention.

Referring to FIGS. 1 and 2, a method for calculating local variance and local mean, generally designated 60, is shown. Method 60 implements the following formula for the calculation of the local variance of a window with origin (n, m) in an array of data:

$$VAR_{n,m} = \frac{1}{H*V}\left(\sum_{p=0}^{V-1}\sum_{q=0}^{H-1} S^2_{n+p,m+q} - \frac{1}{H*V}\left(\sum_{p=0}^{V-1}\sum_{q=0}^{H-1} S_{n+p,m+q}\right)^2\right) \quad (3)$$

Formula (3) is obtained by replacing the MEAN in formula (2) with its expression in formula (1), expanding the squares and regrouping the terms. In formula (3), as in FIG. 1, "H" and "V" are the horizontal and vertical size (in samples) of the rectangular window 12 in which the statistics are calculated, "m" and "n" represent points along the "j" and "i" axes, respectively, and "p" and "q" are the vertical and horizontal position indexes relative to the window 12 origin.

The samples in image array 10 are provided to variance calculating method 60 in sequential fashion. For example, the data in array 10 may be provided in a line-wise ($S_{i,j}$, $S_{i,j+1}$, $S_{i,j+2}$ ... $S_{i+1,j}$, $S_{i+1,j+1}$, $S_{i+1,j+2}$ ... ) (horizontal raster) fashion. Alternately, the data may be read in a column-wise (beam-wise) fashion ($S_{i,j}$, $S_{i+1,j}$, $S_{i+2,j}$ ... $S_{i,j+1}$, $S_{i+1,j+1}$, $S_{i+2,j+1}$ ... ).

Variance calculating method 60 starts at block 62, then continues to block 64 where a new input sample 14, represented mathematically as $S_{n+(V-1),m+(H-1)}$, is read. In block 66, sample 14 ($S_{n+(V-1),m+(H-1)}$) is input into a recursive sum algorithm, described hereinafter, that calculates the sum of all samples in window 12 and outputs this sum $$\left(\sum_{p=0}^{V-1}\sum_{q=0}^{H-1} S_{n+p,m+q}\right)$$

to "a", which represents an individual data line for a circuit implementation or a register in computer memory for software implementations. Similarly, in block 66, the square of sample 14 ($S_{n+(V-1),m+(H-1)}^2$) is input into a recursive sum algorithm that calculates the sum of the squares of all samples in window 12 and outputs this sum $$\left(\sum_{p=0}^{V-1}\sum_{q=0}^{H-1} S_{n+p,m+q}^2\right)$$

to "b", which represents an individual data line for a circuit implementation or a register in computer memory for software implementations. In block 68, the value in "a" is divided by the size of window 12 (i.e. the product of the horizontal size "H" and vertical size "V"), and in block 70 this value is output as the local mean for window 12. At block 72, the square of the value in "a" is divided by the size of window 12 (i.e. the product of the horizontal size "H" and vertical size "V"), and the result is subtracted from the value in "b". The result of the subtraction is then divided by the product of the horizontal size "H" and vertical size "V" of window 12. In block 74, this value is output as the local variance for window 12 with origin at (m, n). Block 76 returns the process to the start, where the next input sample 16, represented mathematically as $S_{n+(V-1),(m+1)+(H-1)}$, is read from the input string and the variance and mean for the next window position (origin at (n, m+1)) is calculated. The process repeats until the input string is exhausted.

Figure 3:
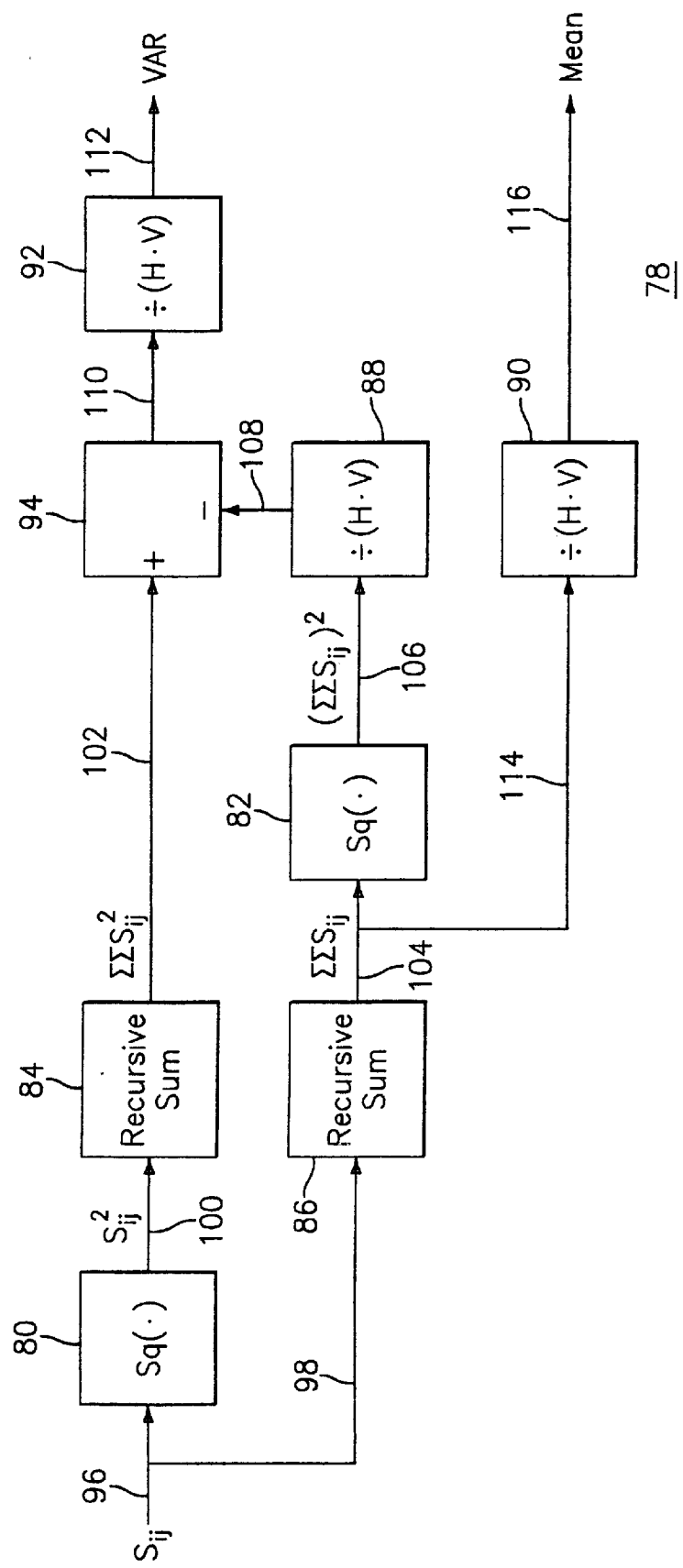
FIG. 3 is a schematic diagram of a circuit for calculating local variance and local mean in real-time using the method of FIG. 2.

FIG. 3 is a block diagram of a circuit for the real-time calculation of local variance and local mean, generally designated 78, implementing method 60 of FIG. 2. Circuit 78 comprises squaring devices 80, 82; recursive sum devices 84, 86; dividing devices 88, 90, 92; and subtracting device 94. Circuit 78 receives a digital signal indicative of the echo intensity at a point in a transducer target area (e.g. sample 14 in FIG. 1) via input line 96. This sample is received by squaring device 80, via line 96, and recursive sum device 86 via line 98. Squaring device 80 comprises a multiplier or look-up table such that its output is a signal indicative of the square of the input value (output =$S_{n+(V-1),m+(H-1)}^2$). The output of squaring device 80 is received by recursive sum device 84 via line 100. Recursive sum devices 84 and 86 implement the recursive sum algorithm as described hereinafter. Recursive sum device 84 sums the squares of the samples ($S_{ij}^2$) in the current window and outputs a signal indicative of the value $$\sum_{p=0}^{V-1}\sum_{q=0}^{H-1} S_{n+p,m+q}^2$$

to line 102. Recursive sum device 86 sums the samples ($S_{ij}$) in the current window of the array and outputs a signal indicative of the value $$\sum_{p=0}^{V-1}\sum_{q=0}^{H-1} S_{n+p,m+q}$$

to line 104. The output of recursive sum device 86 is received by squaring device 82. Squaring device 82 outputs a signal indicative of the value $$\left(\sum_{p=0}^{V-1}\sum_{q=0}^{H-1} S_{n+p,m+q}\right)^2$$

to line 106. This signal is received by dividing device 88, which comprises a division circuit or a lookup table to divide the input value by (H*V), forming the $$\frac{1}{H*V}\left(\sum_{p=0}^{V-1}\sum_{q=0}^{H-1} S_{n+p,m+q}\right)^2$$

part of formula (3). Subtracting device 94 receives the output from recursive sum device 84 via line 102 and subtracts from this value the value received from the output of dividing device 88 via line 108. The output of subtracting device 94 is a signal indicative of the value $$\sum_{p=0}^{V-1}\sum_{q=0}^{H-1} S_{n+p,m+q}^2 - \frac{1}{H*V}\left(\sum_{p=0}^{V-1}\sum_{q=0}^{H-1} S_{n+p,m+q}\right)^2,$$

which is transferred to dividing device 92 via line 110.

Dividing device 92 divides the value by the product of the horizontal size "H" and vertical size "V" of the window and outputs a signal indicative of the completed variance formula, $$\frac{1}{H*V}\left(\sum_{p=0}^{V-1}\sum_{q=0}^{H-1} S_{n+p,m+q}^2 - \frac{1}{H*V}\left(\sum_{p=0}^{V-1}\sum_{q=0}^{H-1} S_{n+p,m+q}\right)^2\right),$$

to variance output line 112.

The output signal of recursive sum device 86 is also directed to dividing device 90 via line 114. Dividing device 90 divides the input value by the product of the horizontal size "H" and the vertical size "V" of the window (H*V) in order to calculate the local mean for the window at origin n, m. Dividing device 90 outputs a value indicative of the local mean $$\frac{1}{H*V}\sum_{p=0}^{V-1}\sum_{q=0}^{H-1} S_{n+p,m+q}$$

to line 116. If standard deviation rather than variance is needed, then a square root operation may be performed on the final result in device 92.

Circuit 78 calculates local variance and local mean in real-time. In other words, signals indicative of local variance and local mean are output by circuit 78 at the same rate that the samples are input to circuit 78. Various delay registers (not shown) may be added to local variance calculating circuit 78. Such registers may be used for delay alignment of the signals.

The above-described method 60 for calculating local variance and its implementation in circuit 78 allow the real-time calculation of the exact value of local variance and local mean at each position of a window in an array of data. The method and its embodiment provide for the use of recursive sum methods, thus allowing local statistics to be calculated efficiently, with a few, simple operations.

Figure 4:
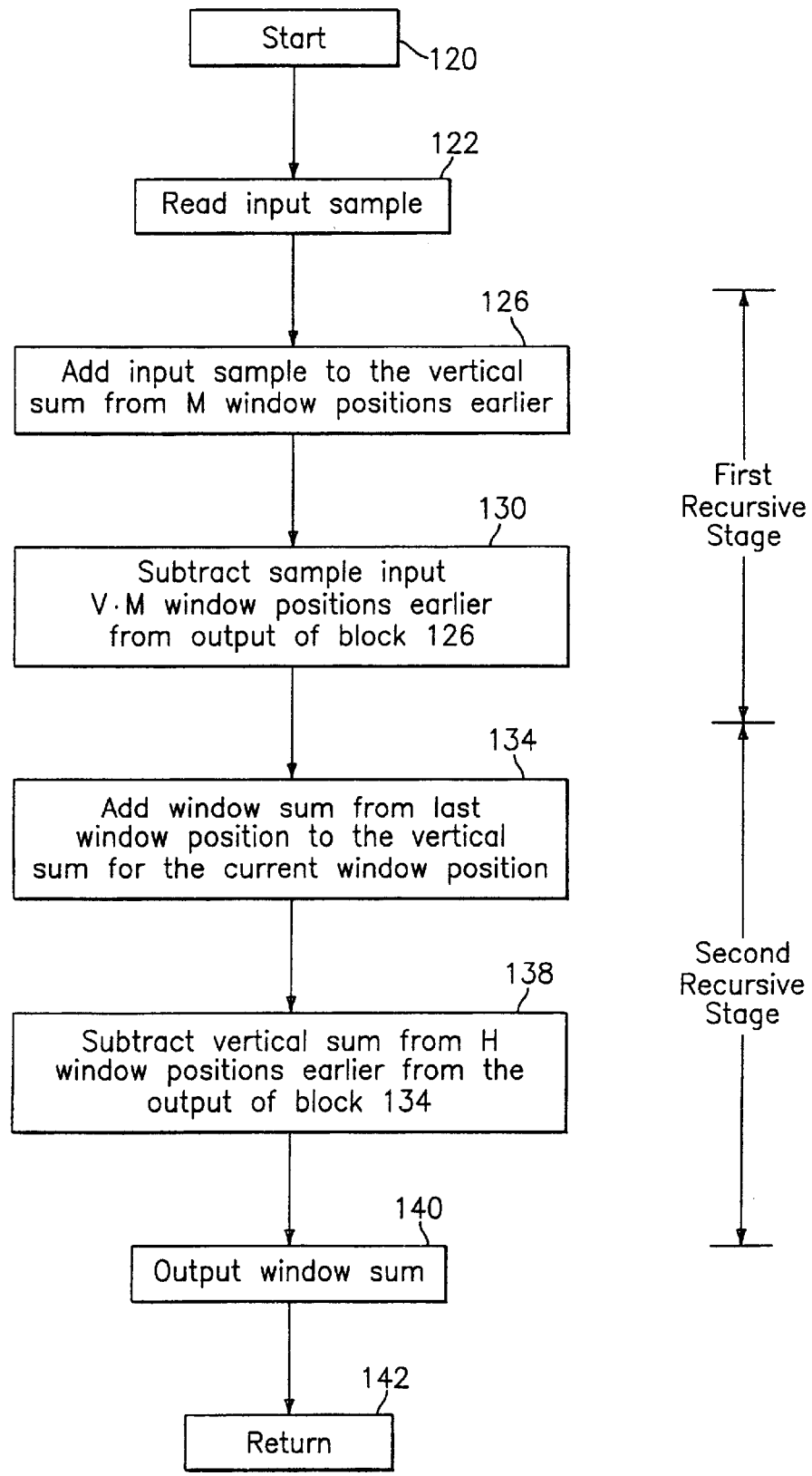
FIG. 4 is a graphical representation of a recursive sum method for use in the local variance and local mean calculation method of FIG. 2.

Referring to FIGS. 1, 2 and 4, FIG. 4 shows a flow chart of a recursive sum method, generally designated 118, for use in block 66 of variance calculation method 60. Recursive sum method 118 starts at block 120 and continues to block 122 where the input sample for the new window position is read from a string of input samples provided by the variance calculation method 60 at block 66. Using window 12 of FIG. 1 as an example, the input sample is sample 14. After the input sample is read, the process then proceeds to block 126, which is part of a first recursive stage.

The first recursive stage, which includes blocks 126 and 130, calculates the sum of the vertical column of samples entering the window as the window moves to the right one sample position. For example, in window 12 of FIG. 1, the first recursive stage sums samples 14, 18, 20, 22, and 24. The sum of the vertical column of samples entering the window is hereinafter referred to as the vertical sum.

In the first recursive stage, the vertical sum is calculated recursively. That is, the vertical sum for the present window position is calculated using the vertical sum from a previous window position. At block 126, the vertical sum from "M" window positions earlier (e.g. the sum of samples 18, 20, 22, 24, and 26) is added to the input sample for the current window position (e.g. sample 14). As previously noted, "M" represents the total number of columns in the image array. The result of block 126 is, for example, the sum of samples 14, 18, 20, 22, 24, and 26. At block 130, the input sample from V*M window positions earlier (e.g. sample 26) is subtracted from the value calculated by block 126, where V*M is the product of the vertical size "V" of the window (in samples) and the total number of columns in the image array "M". The result from block 130 is the vertical sum for the current window position (e.g. the sum of samples 14, 18, 20, 22, and 24).

A second recursive stage of method 118 includes blocks 134 and 138. The second recursive stage calculates the sum of all samples in the window, hereinafter referred to as the window sum. In the second recursive stage, the window sum is calculated recursively. That is, the window sum for the present window position is calculated using the window sum from a previous window position. At block 134, the window sum from the last window position is added to the vertical sum for the present window position, which was calculated in block 130. The result of block 134 includes, for example, the sum of all samples in window 12 in addition to samples 28, 30, 32, 34, and 36, which were part of the window sum from the last window position. At block 138, the vertical sum from "H" window positions earlier (e.g., the sum of samples 28, 30, 32, 34, and 36) is subtracted from the result of block 134. As previously noted, "H" represents the horizontal size (in samples) of the window. The result of block 138 is the window sum for the current window position (e.g. the sum of all samples in window 12).

At block 140, the window sum for the current window position is output to the variance calculation method 60 at block 66. Block 142 returns the process to the start, where the next sample is read from the input string. The process repeats until the input string is exhausted.

Referring to FIGS. 1, 3, 4, and 5, FIG. 5 shows a two-dimensional recursive sum circuit, generally designated 144, implementing method 118 of FIG. 4. Circuit 144 includes a first recursive stage 146 and a second recursive stage 148. First recursive stage 146 includes delay devices 150, 152, adding device 154, and subtracting device 156. Second recursive stage 148 includes delay device 158, adding device 160, subtracting device 162, and delay flip-flop 164. Circuit 144 can be implemented in device 84 of FIG. 5 to calculate the sum of the square of samples $$\sum_{p=0}^{V-1}\sum_{q=0}^{H-1} S_{n+p,m+q}^2$$

portion of formula (3)), and in device 86 of FIG. 3 to calculate the sum of the samples $$\sum_{p=0}^{V-1}\sum_{q=0}^{H-1} S_{n+p,m+q}$$

portion of formulas (1) and (3)). For purposes of example, circuit 144 will be described as being implemented in device 86 of FIG. 3.

First recursive stage 146 of circuit 144 receives a digital signal indicative of echo intensity (a sample) from line 98 of circuit 78 (FIG. 3). For example, in window 12 of FIG. 1, this digital signal is represented by sample 14. Within first recursive stage 146, the sample is received by adding device 154 and V*M delay device 150 via lines 168 and 170.

V*M delay device 150 comprises a storage means, such as a FIFO queue or RAM, which provides a delay equal to the number of samples in as many lines as the window's vertical size (V lines*M samples/line). For example, the V*M delay device 150 accepts input sample 14 and pushes it onto the bottom of a FIFO queue of height V*M; sample 26 is then popped from the top of the queue and output to line 172.

Adding device 154 receives the input sample (e.g. sample 14) from line 168, and a signal indicative of the vertical sum from "M" window positions earlier (e.g. the sum of samples 18, 20, 22, 24, and 26) from line 174. Adding device 154 then sums these two inputs, as described in block 126 of method 118, and outputs a signal indicative of this value (e.g. the sum of samples 14, 18, 20, 22, 24, and 26) to line 176.

Subtracting device 156 accepts the signal from adding device 154 via line 176, and subtracts from it the input sample from V*M window positions earlier (e.g. sample 26), which is transmitted to device 156 from device 150 via line 172. Subtracting device 156 outputs a signal indicative of the vertical sum for the current window position (e.g. the sum of samples 14, 18, 20, 22, and 24) to line 178. Lines 180, 182 and 184 receive this signal from line 178.

M-Delay 152 receives the signal indicative of the vertical sum for the current window position (e.g. the sum of samples 14, 18, 20, 22, and 24) from line 180. M-Delay 152 comprises a storage means, such as a FIFO queue or RAM, which provides a delay equal to the number of columns in the image array. M-delay device 152 accepts a signal indicative of the vertical sum of the current window position (e.g. the sum of samples 14, 18, 20, 22, and 24) and pushes it onto the bottom of a FIFO queue of length M. A signal indicative of the vertical sum from M window positions earlier (e.g. the sum of samples 18, 20, 22, 24, and 26) is then popped from the top of the queue and output to line 174 where it is added to the input sample (e.g. sample 14) at device 154. The choice of delays for M delay 152 and V*M delay 150 assures that the sample from V*M window positions earlier (sanple 26) is available at the output of V*M delay 150 at the same time that the input sample (sample 14) is available at the input of V*M delay 150 and the signal indicative of the vertical sum from M window positions earlier (the sum of 18, 20, 22, 24, and 26) is available at the output of M delay 152.

Second recursive stage 148 receives a signal indicative of the vertical sum for the current window position (e.g. the sum of samples 14, 18, 20, 22, and 24) via line 178. Within second recursive stage 148, the signal from line 178 is provided to adding device 160 and H delay device 158 via lines 182, 184.

H delay device 158 comprises a storage means, such as a FIFO queue or RAM, which provides a delay equal to the horizontal size of the window (H samples). The H delay device 158 accepts a signal indicative of the vertical sum for the current window position (e.g. the sum of samples 14, 18, 20, 22, and 24) and pushes it onto the bottom of a FIFO queue of height H; a signal indicative of the vertical sum from H window positions earlier (e.g. the sum of samples 28, 30, 32, 34, and 36) is then popped from the top of the queue and output to line 186.

Adding device 160 accepts a signal indicative of the window sum from the last window position from line 182, and a signal indicative of the vertical sum for the current window position (e.g. the sum of samples 14, 18, 20, 22, and 24) from line 188. Device 160 then outputs a signal indicative of the sum of the two signals (e.g. the sum of all samples in window 12 and samples 28, 30, 32, 34, and 36) to line 190.

Figure 5:
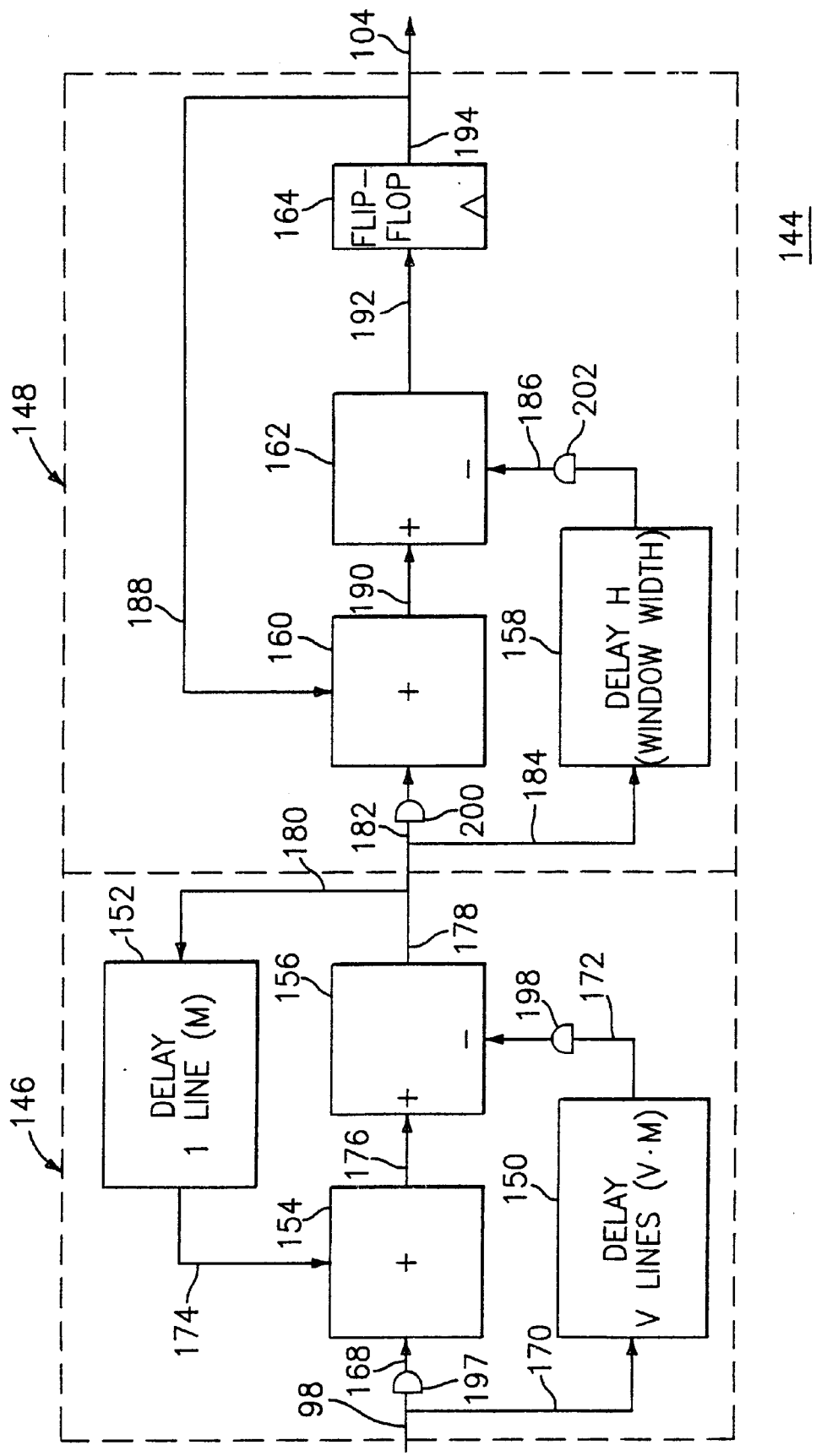
FIG. 5 is a schematic diagram of a circuit for recursively calculating a sum using the method of FIG. 4 for use in the circuit for calculating local variance and local mean of FIG. 3.

Subtracting device 162 accepts the signal from adding device 160 via line 190, and subtracts from it a signal indicative of the vertical sum from H window positions earlier (e.g. the sum of samples 28, 30, 32, 34, and 36) from line 186. Subtracting device 162 outputs a signal indicative of the window sum for the current window position (e.g. the sum of all samples in window 12) to line 192. This signal is received by delay flip-flop 164, which provides a delay equal to one sample. The output of delay flip-flop 164 is provided to line 194 where it is received by addition device 160 via line 188, and is also received by line 104 of real-time local variance calculating circuit 78 (FIG. 5).

AND gates 197, 198, 199, and 200 located on lines 168, 172, 182, and 186, respectively, are used to activate/deactivate the lines as they are needed. For example, line 172 is deactivated until V*M samples have been stored in V*M Delay device 150. Line 168 is deactivated after bottom of the window reaches the bottom of the array, where only subtraction of samples is needed. Line 186 is deactivated until the vertical stun for H window positions have been stored in H delay 158. Line 182 is deactivated after the window has reached the right side of the array, where only subtraction of vertical sums is needed. Lines 168, 172, 182, and 186 are activated as needed by sending a "1" signal to the AND gate for the line. Lines 168, 172, 182, 186 are deactivated by sending a "0" signal to the AND gates for the line. A timing device (not shown) sends the signal to activate/deactivate lines.

The above-described recursive sum method 118 and its implementation in circuit 144 reduce the number of computations necessary to sum the values within a window when the position of the window is changed. Only two additions and two subtractions are performed for a 2-dimensional window of any size. No calculations are needed for the samples belonging to both the old and the new window position.

When used in conjunction with the above-described variance calculating method 60 and variance calculating circuit 78, recursive sum method 118 and recursive sum circuit 144 allow local statistics to be calculated efficiently, with a few, simple operations. Thus, the invention reduces the number of computations necessary to calculate the local variance.

The above-described embodiment is applied to a 2-dimensional array of digital signals provided by beam forming circuitry in an ultrasound imaging system. One skilled in the art will see that the above-described embodiment is also applicable to any 2-dimensional array of digital signals representing, for example, pixels along the lines of a rectangular display raster. In addition, the same principles applied in the above-described embodiment apply to arrays of lower dimension (1) or higher dimension (3 or higher) as well by providing the respective number of recursive stages with delay lines of proper sizes. For example, the second recursive stage 148 of recursive sum circuit 144 can be used in local variance calculating circuit 78 for the calculation of local variance in one-dimensional arrays.

Figure 6:
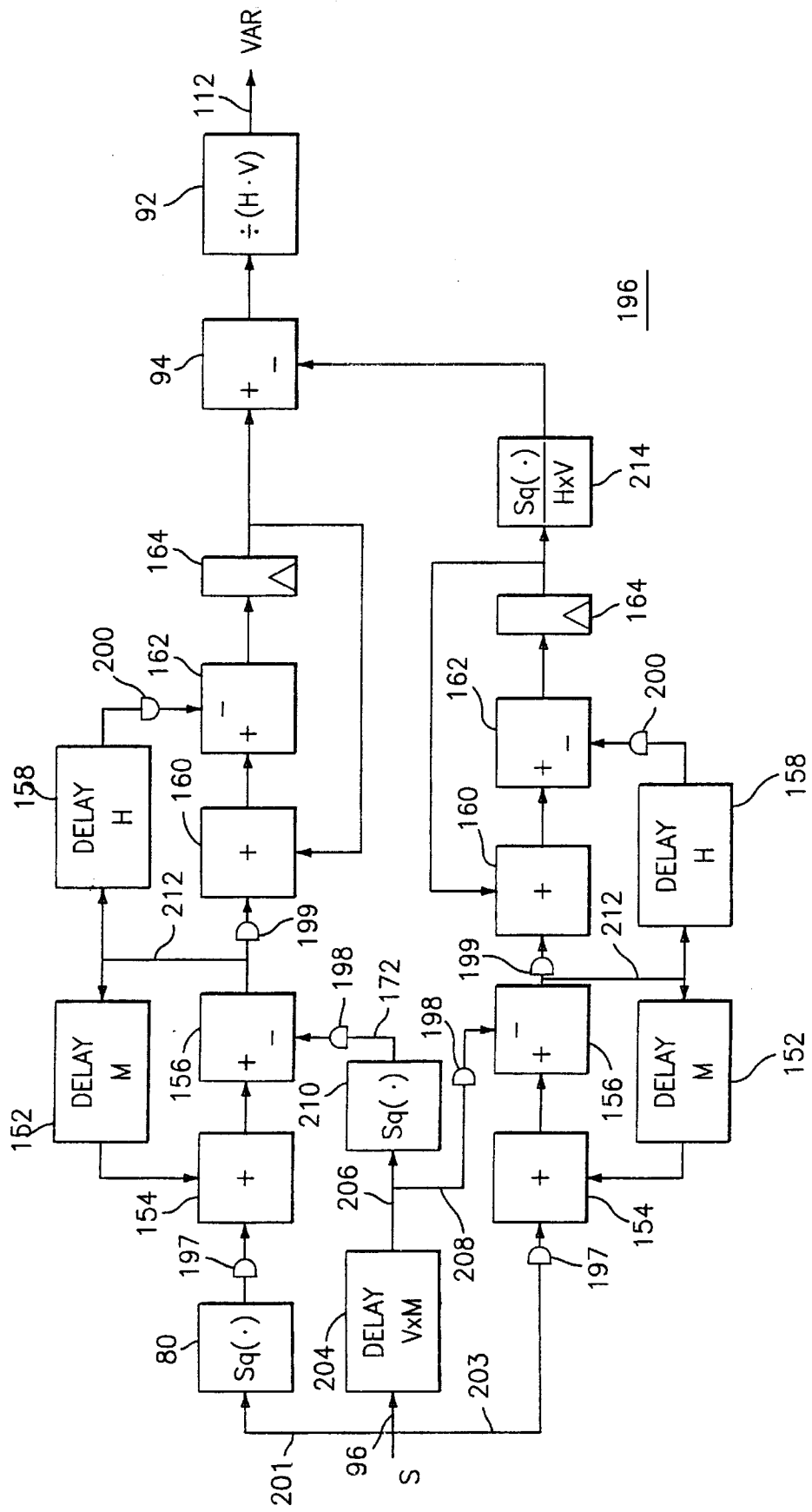
FIG. 6 is a schematic diagram of a circuit for calculating local variance using the methods of FIG. 2 and FIG. 4.

FIG. 6 shows a particularly economical embodiment of the invention, in which the V*M delay of two recursive sum circuits 144 is shared. The real-time local variance calculating circuit shown in FIG. 6, generally designated 196, is substantially similar to the real-time local variance calculating circuit 78 of FIG. 3 including two recursive sum circuits 144 of FIG. 5, with like elements numbered alike and differences described below.

Referring to FIGS. 1 and 6, input line 96 of circuit 196 distributes the input sample (e.g. sample 14 in FIG. 1) to lines 201, 203. Line 96 provides the input sample to shared V*M delay 204, which comprises a storage means such as a FIFO queue or RAM. Shared V*M delay 204 provides a delay equal to the number of samples in as many lines as the window's vertical size (V lines*M samples/line). For example, the shared V*M delay 204 accepts sample 14, represented mathematically as $S_{n+(V-1), m+(H-1)}$, and pushes it onto the bottom of a FIFO queue of height V*M. Sample 26 ($S_{n-1,m+(H-1)}$) is then popped from the top of the FIFO queue and output to lines 206, 208. Line 208 provides sample 26 ($S_{n-1,m+(H-1)}$) to a first subtracting device 156. Line 206 provides sample 26 ($S_{n-1,m+(H-1)}$) to squaring device 210. Squaring device 210 comprises a multiplier or look-up table such that the signal output to line 172 is indicative of the square of the input signal (output=$S^2_{n-1, m+(H-1)}$). Line 172 provides a signal indicative of the value $S_{m-1,m+(H-1)}$ to a second subtracting device 156. Lines 180 and 184 (FIG. 7) have been replaced with line 212, and squaring and division devices 82 and 88 (FIG. 5) have been combined into one squaring/division device 214, which performs the same function. All other elements are as described for FIGS. 3 and 5.

The embodiment shown in FIG. 6 eliminates the need for two V*M delays. Thus, there is a significant reduction in the amount of memory needed, especially when the horizontal size of the window (H) or the horizontal size of the array (M), or both, are large.

The real-time local variance calculating circuit of FIG. 6 includes two recursive sum circuits, one to calculate the sum of the square of samples in the window $$\left(\sum_{p=0}^{V-1}\sum_{q=0}^{H-1} S^2_{n+p,m+q}\right)$$

and the other to calculate the recursive sum of the samples in the window $$\left(\sum_{p=0}^{V-1}\sum_{q=0}^{H-1} S_{n+p,m+q}\right).$$

As can be seen in FIG. 6, the two recursive sum circuits each require a set of adders, subtractors and delays. In total, both recursive sum circuits require the use of 4 adders, 4 subtractors, and 5 delays.

Figure 7:
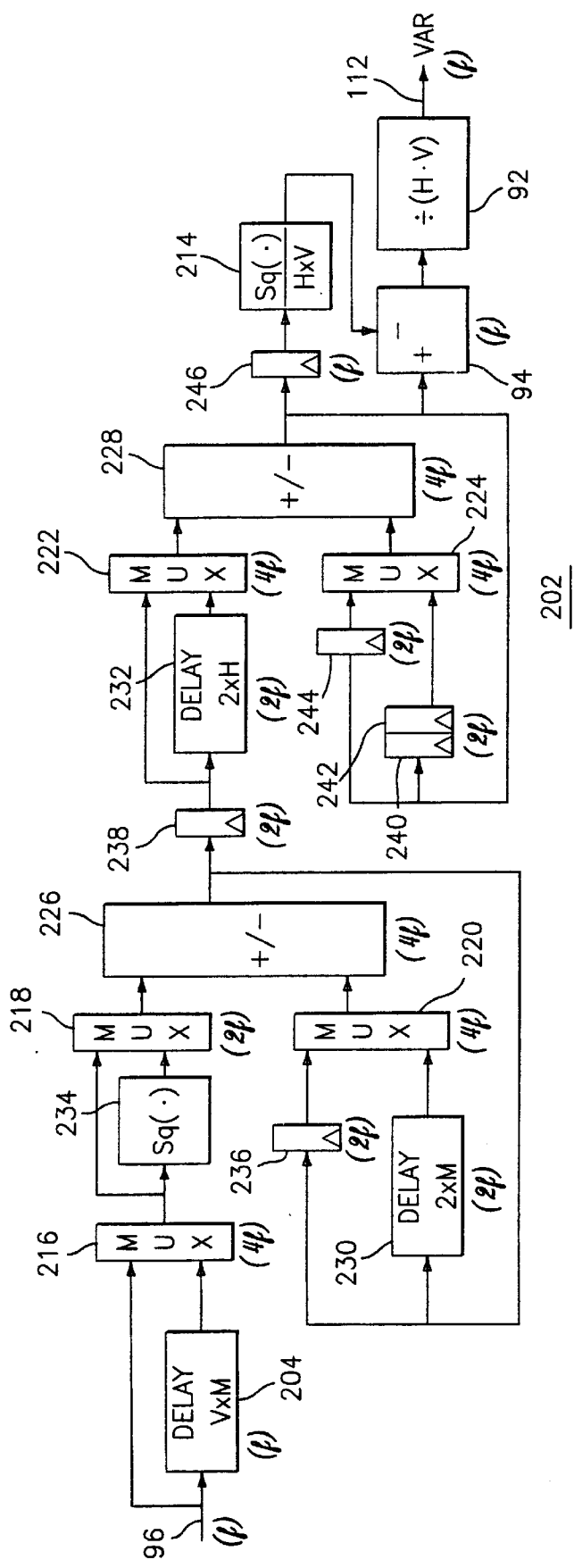
FIG. 7 is a schematic diagram of a circuit employing time-division multiplexing in the calculation of local variance using the methods of FIG. 2 and FIG. 4.

FIG. 7 shows an alternate embodiment of the invention in which a variance calculating circuit 202 includes time-division multiplexing to allow one set of adders, subtractors, and delay units to be used to calculate the recursive sum for both the sum of the squares of samples $$\left(\sum_{p=0}^{V-1}\sum_{q=0}^{H-1} S_{n+p,m+q}^2\right)$$

and the sum of samples $$\left(\sum_{p=0}^{V-1}\sum_{q=0}^{H-1} S_{n+p,m+q}\right).$$

This embodiment may be implemented if the rate at which the variance calculating circuit receives the samples is lower than the clock rate available to the circuit. The number in parentheses near various devices of FIG. 7 indicates the frequency of operation of these devices. For example, the sample rate is "f" and the circuit clock rate is 4*f (e.g. f=10 MHz, 4f=40 MHz, frequencies typical for modern ultrasound scanners).

In FIG. 7, multiplexing devices (multiplexers) 216, 218, 220, 222, 224 have been added to allow various operands to be fed to the inputs of multiplexed arithmetic devices 226, 228. It can be seen that the 4 adding devices and 4 subtracting devices of FIG. 6 have been replaced by only 2 multiplexed arithmetic devices (adder/subtractors) 226, 228. Time-multiplexed adder/subtractor 226 performs the same operations previously described for adding device 154 and subtracting device 156 of FIGS. 5 and 6. Time-multiplexed adder/subtractor 228 performs the same operations previously described for adding device 160 and subtracting device 162 of FIGS. 5 and 6. In other words, one time-multiplexed adder/subtractor 226 or 228 performs both the addition and the subtraction operations for both the sum of samples and the sum of the squared samples in the window; time-multiplexed adder/subtractor 226 performs these operations for the first recursive stage and adder/subtractor 228 performs the operations for the second recursive stage.

It can also be seen that the 4 delay devices 152, 158 of FIG. 8 have been replaced by 2 memory units 230, 232. Memory unit 230 comprises a storage means, such as a FIFO queue or RAM, which provides a delay equal to two times the number of samples in each line (M samples/line). Similarly, memory unit 232 comprises a storage means, such as a FIFO queue or RAM, which provides a delay equal to two times the horizontal size of the window (H samples). Memory units 230 and 232 accept the input values in interleaved fashion. That is, an input signal used in calculating the sum of the squares of the samples $$\left(\sum_{p=0}^{V-1}\sum_{q=0}^{H-1} S_{n+p,m+q}\right)$$

is pushed onto the queue immediately before the signal used in calculating the sum of the samples $$\left(\sum_{p=0}^{V-1}\sum_{q=0}^{H-1} S_{n+p,m+q}^2\right).$$

Thus, while the number of memory units has been reduced, the total amount of memory does not change from that required in the FIG. 8 embodiment. In addition, the two squaring devices 80, 210 (look-up tables or multipliers) shown in FIG. 8 have been reduced to only one squaring device 234 and a number of delay flip-flops 236–246 have been added for time alignment of the signals.

Referring to FIGS. 1 and 7, the sequence of time-multiplexed operations of the circuit in FIG. 7 will be now described for a circuit with a clock frequency of 4f, where f is the input and output sample frequency. Circuit 202 receives a new sample (e.g. sample 14 of FIG. 1) at a first clock cycle, arbitrarily labeled cycle 0. The new sample is available at the circuit's input for 4 clock cycles, clock cycles 0, 1, 2, 3. The operation of circuit 202 for clock cycles 0 through 5 is described below.

During cycle 0, multiplexers 216 and 218 are set to allow the new sample (e.g. sample 14) to reach one input of the time-multiplexed adder/subtractor 226. Multiplexer 220 is set to allow the output of 2*M delay device 230, a signal indicative of the vertical sum of samples from M window positions earlier (e.g. the sum of samples 18, 20, 22, 24, and 26), to reach the other input of the adder/subtractor 226. The adder/subtractor 226 is controlled to perform an addition, adding the new sample to the vertical sum from M window positions earlier. The output signal of adder/subtractor 226 (a signal indicative of the sum of samples 14, 18, 20, 22, 24, and 26) is stored in register 236.

In clock cycle 1, multiplexer 216 is switched to allow the output of V*M delay device 204, the input sample from V*M window positions earlier (e.g. sample 26), to reach the input of adder/subtractor 226. Multiplexer 220 is switched to allow the output of register 236 (a signal indicative of the sum of samples 14, 18, 20, 22, 24, and 26) to reach the other input of the adder/subtractor 226. The adder/subtractor 226 is now controlled to operate as a subtractor, subtracting the sample from V*M window positions earlier (sample 26) from the output of register 236. The output of adder/subtractor 226 is a signal indicative of the vertical sum of samples for the current window position (the sum of samples 14, 18, 20, 22, and 24), as previously described. The signal output from adder/subtractor 226 is pushed on 2*M delay queue 230 and, at the same time, is stored in register 238 to provide input to the second recursive stage. When the signal from adder/subtractor 225 is pushed on the 2*M delay queue 230, a signal indicative of the vertical sum of squared samples from M window positions earlier is popped from the 2*M delay queue 230.

In clock cycle 2, multiplexers 216 and 218 are switched to allow the output of squaring device 234, a signal indicative of the square of the new sample (sample 14 squared), to reach the first input of adder/subtractor 226. Multiplexer 220 is switched to allow the output of 2*M delay device 230, a signal indicative of the vertical sum of squared samples from M window positions earlier (e.g. the sum of the square of samples 18, 20, 22, 24, and 26), to reach the other input of adder/subtractor 226. Adder/subtractor 226 is controlled to perform an addition, adding the new squared sample (sample 14 squared) to the vertical sum of squared samples from M window positions earlier. The output signal of adder/subtractor 226 (a signal indicative of the sum of the square of samples 14, 18, 20, 22, 24, and 26) is stored in the register 236.

At the same time in the second recursive stage, multiplexer 222 is set to allow the output of register 238, a signal indicative of the vertical sum of samples for the current window position, to reach the first input of adder/subtractor 228. Multiplexer 224 is set to allow the output of register 242, a signal indicative of the sum all samples within the window (window sum) from the previous window position, to reach the other input of the adder/subtractor 228. Adder/subtractor 223 is controlled to perform an addition, adding the vertical sum of samples for the current window position to the window sum from the previous window position. The output signal of adder/subtractor 223 is stored in register 244.

In clock cycle 3 multiplexer 216 is switched to allow the output of V*M delay device 204, the input sample from V*M positions earlier (e.g. sample 26), to reach the input of the squaring device 234. The output of squaring device 234 (sample 26 squared) passes through the multiplexer 218 to the input of the adder/subtractor 226. Multiplexer 220 is switched to allow the output of register 236 (a signal indicative of the sum of the square of samples 14, 18, 20, 22, 24, and 26) to reach the other input of the adder/subtractor 226. The adder/subtractor 226 is now controlled to operate as a subtractor, subtracting the square of the input sample from V*M window positions earlier (sample 112) from the output of register 236. The output of adder/subtractor 226 is a signal indicative of the vertical sum of squared samples for the current window position (the sum of the square of samples 14, 18, 20, 22, and 24), as previously described. The signal output by adder/subtractor 226 is pushed on the delay queue 230 and, at the same time, is stored in register 238 to provide input to the second recursive stage. When the signal indicative of the vertical sum of squared samples is pushed on the delay queue 230, a signal indicative of the vertical sum of samples from M+1 window positions earlier is popped from the delay queue to be used for processing the next sample.

At the same time in the second recursive stage, multiplexer 222 is switched to allow the output from 2*H delay device 232, a signal indicative of the vertical sum of samples from H window positions earlier (the sum of samples 28, 30, 32, 34, and 36), to reach the first input of adder/subtractor 228. Multiplexer 224 is switched to allow the output of register 244 (a signal indicative of the sum of all samples in window 12 and samples 28, 30, 32, 34, and 36) to reach the other input of the adder/subtractor 228. Adder/subtractor 228 is controlled to perform a subtraction, subtracting the vertical sum from H window positions earlier from the output of register 244. The output of adder/subtractor 228 is a signal indicative of the sum all samples within the window (window sum) at its current position. The signal output by adder/subtractor 228 is stored both in the output register 246 and in the feedback register 240. At the same time, the previous content of feedback register 240, a signal indicative of the sum of the squares of all samples in the previous window position, is shifted into register 242. The contents of register 238, a signal indicative of the vertical sum for the current window position (the sum of samples 14, 18, 20, 22, and 24), is pushed on the 2*H delay queue 232.

In clock cycle 4 a new sample becomes available (for the next 4 cycles) at the input of the circuit 202, and the first recursive stage starts processing it. In the second recursive stage multiplexer 222 is set to allow the output of register 238, a signal indicative of the vertical sum of squared samples for the current window position (the sum of the square of samples 14, 18, 20, 22, and 24), to reach the first input of adder/subtractor 228. Multiplexer 224 is set to allow the output of register 242, a signal indicative of the sum of the squares of all samples in the previous window position, to reach the other input of the adder/subtractor 228. Adder/subtractor 223 is controlled to perform an addition, and the output signal of adder/subtractor 223 is stored in register 244.

In clock cycle 5 multiplexer 222 is switched to allow the output from 2*H delay device 232, a signal indicative of the vertical sum of the squared samples form H window positions earlier (the sum of the square of samples 28, 30, 32, 34, and 36), to reach the first input of adder/subtractor 228. Multiplexer 224 is switched to allow the output of register 244 (a signal indicative of the sum of the squares of all samples in window 12 and samples 28, 30, 32, 34, and 36) to reach the other input of the adder/subtractor 228. Adder/subtractor 228 is controlled to perform a subtraction, subtracting the vertical sum of squared samples from H window positions earlier from the output of register 244. The output of adder/subtractor 228 is a signal indicative of the sum of the square of all samples within the window at its current position. The signal output by adder/subtractor 228 is provided to the positive input of subtracting device 94 and is stored in feedback register 240. The previous content of feedback register 240, a signal indicative the sum of all samples in the current window position, is shifted into register 242. The contents of register 238, a signal indicative of the vertical sum of squared samples (the sum of the squares of samples 14, 18, 20, 22, and 24) is pushed on 2*H delay queue 232. The contents of register 246, a signal indicative of the sum of samples in the current window position, is provided to squaring/division device 214 where value is divided by the product H*V. The output of squaring/division device 214 is applied to the negative input of subtracting device 94. Finally, the output of subtracting device 94 is divided by the product H*V in dividing device 112 to produce a signal indicative of the variance for the current window position.

The circuit shown in FIG. 7 is considerably less expensive than the one of FIG. 6, especially when implemented with a custom CMOS integrated circuit (e.g. a gate array). It may also be implemented with two digital signal processors, one for the first recursive stage and the other for the second recursive stage, plus some additional circuit for the final stage where the two sums are combined. Other variations of the circuit can be devised for various combinations of sample and clock rate.

The variance value calculated using method 60 or circuits 78, 196, and 202 can be input into a method for enhancing one of the samples within the window. For example, the variance value can be input into a speckle reduction method. Such methods are known in the art.

The method for calculating local variance and local mean 60 and the recursive sum method 118 can also be implemented in software, especially if a fast digital signal processor with on-board RAM for the implementation of the delay lines is used. Depending on the speed requirements, multiple digital signal processing devices may be used in parallel.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An apparatus for calculating local variance in an array of digital signals, said apparatus comprising:
   a first squaring device arranged to receive an input signal and provide a first signal indicative of a first value, the first value being equal to a square of the input value, said input signal being one of a plurality of signals within a window defined in the array, said plurality of signals indicative of a plurality of values;

a first recursive sum device arranged to receive said first signal and provide a second signal indicative of a second value, the second value being equal to a sum of the squares of the plurality of values;

a second recursive sum device arranged to receive said input signal and provide a third signal indicative of a third value, the third value being equal to a sum of the plurality of values;

a second squaring device arranged to receive said third signal and provide a fourth signal indicative of a fourth value, the fourth value being equal to a square of the third value;

a first dividing device arranged to receive said fourth signal and provide a fifth signal indicative of a fifth value, the fifth value being equal to the fourth value divided by the number of signals in said plurality of signals;

a first subtracting device arranged to receive said second and fifth signals and provide a sixth signal indicative of a sixth value, the sixth value being equal to the second value minus the fifth value; and a second dividing device arranged to receive said sixth signal and provide an output signal indicative of a variance of the plurality of values;

wherein the first recursive sum device comprises:

a first recursive stage including, a first delay device arranged to receive said first signal and delay said first signal for a first predetermined number of clock cycles, said first delay device providing a seventh signal indicative of a seventh value, said seventh signal having been delayed by said first delay device for said first predetermined number of clock cycles, a first adding device arranged to receive said first signal and a ninth signal and provide an eighth signal indicative of an eighth value, the eighth value being equal to a sum of the first value and a ninth value indicated by said ninth signal, a second subtracting device arranged to receive said seventh and eighth signals and provide a tenth signal indicative of a tenth value, the tenth value being equal to a difference between the eighth and seventh values, and a second delay device arranged to receive said tenth signal and delay said tenth signal for a second predetermined number of clock cycles, said second delay device providing said ninth signal, said ninth signal having been delayed by said second delay device for said second predetermined number of clock cycles; and a second recursive stage including, a third delay device arranged to receive said tenth signal and delay said tenth signal for a third predetermined number of clock cycles, said third delay device providing an eleventh signal indicative of an eleventh value, said eleventh signal having been delayed by said third delay device for said third predetermined number of clock cycles, a second adding device arranged to receive said tenth signal and a twelfth signal and provide a thirteenth signal indicative of a thirteenth value, the thirteenth value being equal to a sum of the tenth value and a twelfth value indicated by said twelfth signal, a third subtracting device arranged to receive said eleventh and thirteenth signals and provide a four-teenth signal indicative of a fourteenth value, the fourteenth value being equal to a difference between the thirteenth and eleventh values, and a fourth delay device arranged to receive said fourteenth signal and delay said fourteenth signal for a fourth predetermined number of clock cycles, said fourth delay providing said second signal.

2. The apparatus of claim 1 wherein, said first predetermined number of clock cycles is equal to a product of the number of digital signals in a first dimension of the window and the number of digital signals in a second dimension of the array;

said second predetermined number of clock cycles is equal to the number of digital signals in the second dimension of the array;

said third predetermined number of clock cycles is equal to the number of digital signals in the first dimension of the window; and said fourth predetermined number of clock cycles is equal to one.

3. The apparatus of claim 1 wherein at least one of said first, second, third, and fourth delay devices comprises a first-in first-out queue in computer memory.

4. An apparatus for calculating local variance in an array of digital signals, said apparatus comprising:

a first squaring device arranged to receive an input signal and provide a first signal indicative of a first value, the first value being equal to a square of the input value, said input signal being one of a plurality of signals within a window defined in the array, said plurality of signals indicative of a plurality of values;

a first recursive sum device arranged to receive said first signal and provide a second signal indicative of a second value, the second value being equal to a sum of the squares of the plurality of values;

a second recursive sum device arranged to receive said input signal and provide a third signal indicative of a third value, the third value being equal to a sum of the plurality of values;

a second squaring device arranged to receive said third signal and provide a fourth signal indicative of a fourth value, the fourth value being equal to a square of the third value;

a first dividing device arranged to receive said fourth signal and provide a fifth signal indicative of a fifth value, the fifth value being equal to the fourth value divided by the number of signals in said plurality of signals;

a first subtracting device arranged to receive said second and fifth signals and provide a sixth signal indicative of a sixth value, the sixth value being equal to the second value minus the fifth value; and a second dividing device arranged to receive said sixth signal and provide an output signal indicative of a variance of the plurality of values;

wherein the second recursive sum device comprises:

a first recursive stage including, a first delay device arranged to receive said input signal and delay said input signal for a first predetermined number of clock cycles, said first delay device providing a seventh signal indicative of a seventh value, said seventh signal having been delayed by said first delay device for said first predetermined number of clock cycles, a first adding device arranged to receive said input signal and a ninth signal and provide an eighth signal indicative of an eighth value, the eighth value being equal to a sum of the input value and a ninth value indicated by said ninth signal, a second subtracting device arranged to receive said seventh and eighth signals and provide a tenth signal indicative of a tenth value, the tenth value being equal to a difference between the eighth and seventh values, and a second delay device arranged to receive said tenth signal and delay said tenth signal for a second predetermined number of clock cycles, said second delay device providing said ninth signal, said ninth signal having been delayed by said second delay device for said second predetermined number of clock cycles; and a second recursive stage including,
a third delay device arranged to receive said tenth signal and delay said tenth signal for a third predetermined number of clock cycles, said third delay device providing an eleventh signal indicative of an eleventh value, said eleventh signal having been delayed by said third delay device for said third predetermined number of clock cycles, a second adding device arranged to receive said tenth signal and a twelfth signal and provide a thirteenth signal indicative of a thirteenth value, the thirteenth value being equal to a sum of the tenth value and a twelfth value indicated by said twelfth signal, a third subtracting device arranged to receive said eleventh and thirteenth signals and provide a fourteenth signal indicative of a fourteenth value, the fourteenth value being equal to a difference between the thirteenth and eleventh values, and a fourth delay device arranged to receive said fourteenth signal and delay said fourteenth signal for a fourth predetermined number of clock cycles, said fourth delay providing said third signal.

5. The apparatus of claim 4 wherein,
said first predetermined nuer of clock cycles is equal to a product of the number of digital signals in a first dimension of the window and the number of digital signals in a second dimension of the array;

said second predetermined number of clock cycles is equal to the number of digital signals in the second dimension of the array;

said third predetermined number of clock cycles is equal to the number of digital signals in the first dimension of the window; and said fourth predetermined number of clock cycles is equal to one.

6. The apparatus of claim 4 wherein at least one of said first, second, third, and fourth delay devices comprises a first-in first-out queue in computer memory.

7. The apparatus of claim 4 wherein,
said second recursive sum device further includes,
a third squaring device arranged to receive said seventh signal and provide a fifteenth signal indicative of a fifteenth value, the fifteenth value being equal to a square of the seventh value; and said first recursive sum device includes,
a third adding device arranged to receive said first signal and a sixteenth signal and provide a seventeenth signal indicative of a seventeenth value, the seventeenth value being equal to a sum of the first value and a sixteenth value indicated by the sixteenth signal, a fourth subtracting device arranged to receive said fifteenth and seventeenth signals and provide an eighteenth signal indicative of an eighteenth value, the eighteenth value being equal to a difference between the seventeenth and fifteenth values, a fifth delay device arranged to receive said eighteenth signal and delay said eighteenth signal for a fifth predetermined number of clock cycles, said fifth delay device providing the sixteenth signal, said sixteenth signal having been delayed by said fifth delay device for said fifth predetermined number of clock cycles, a sixth delay device arranged to receive said eighteenth signal and delay said eighteenth signal for a sixth predetermined number of clock cycles, said sixth delay device providing a nineteenth signal indicative of a nineteenth value, said nineteenth signal having been delayed by said sixth delay device for said sixth predetermined number of clock cycles, a fourth adding device arranged to receive said eighteenth signal and a twentieth signal and provide a twenty-first signal indicative of a twenty-first value, the twenty-first value being equal to a sum of the eighteenth value and a twentieth value indicated by the twentieth signal, a fifth subtracting device arranged to receive said nineteenth and twenty-first signals and provide a twenty-second signal indicative of a twenty-second value, the twenty-second value being equal to a difference between the twenty-first and nineteenth values, and a seventh delay device arranged to receive said twenty-second signal and delay said twenty-second signal for a seventh predetermined number of clock cycles, said seventh delay providing said second signal.

8. The apparatus of claim 7 wherein at least one of said first, second, third, fourth, fifth, sixth, and seventh delay devices comprises a first-in first-out queue in computer memory.

9. The apparatus of claim 7 wherein at least one of said first, second, and third squaring devices comprises a look-up table.

10. An apparatus for calculating local variance in an array of digital signals, said apparatus comprising:

a first delay device arranged to receive a plurality of digital signals, said plurality of digital signals defining a window within the array, said plurality of digital signals indicative of a plurality of values, said first delay device arranged to delay each of said plurality of digital signals for a first predetermined number of clock cycles;

a first multiplexing device having one input arranged to receive said plurality of digital signals and another input electrically connected to an output of said first delay device, said first multiplexing device for multiplexing signals received from said input line and said first delay device at a first predetermined frequency;

a first squaring device electrically connected to an output of said first multiplexing device, said first squaring device for squaring each of the plurality of values;

a second multiplexing device electrically connected to an output of said first squaring device and to an output of said first multiplexing device, said second multiplexing device for multiplexing signals received from said first squaring device and said first multiplexing device at a second predetermined frequency;

a first multiplexed arithmetic device electrically connected to an output of said second multiplexing device and to an output of a third multiplexing device, said first multiplexed arithmetic device for alternately adding and subtracting signals received from said second and third multiplexing devices at said first predetermined frequency;

a second delay device electrically connected to an output of said first multiplexed arithmetic device, said second delay device arranged to delay signals received from said first multiplexed arithmetic device for a second predetermined number of clock cycles;

a third delay device electrically connected to said output of said first multiplexed arithmetic device, said third delay device arranged to delay signals received from said first multiplexed arithmetic device for a third predetermined number of clock cycles, said third multiplexing device electrically connected to an output of said third delay device and to an output of said second delay device for multiplexing signals received from said second and third delay devices at said first predetermined frequency;

a fourth delay device electrically connected to said output of said first multiplexed arithmetic device, said fourth delay device arranged to delay signals received from said first multiplexed arithmetic device for a fourth predetermined number of clock cycles;

a fifth delay device electrically connected to said output of said fourth delay device, said fifth delay device arranged to delay signals received from said fourth delay device for a fifth predetermined number of clock cycles;

a fourth multiplexing device electrically connected to an output of said fourth delay device and to an output of said fifth delay device, said fourth multiplexing device for multiplexing signals received from said fourth and fifth delay devices at said first predetermined frequency;

a second multiplexed arithmetic device electrically connected to an output of said fourth multiplexing device and to an output of a fifth multiplexing device, said second multiplexed arithmetic device for alternately adding and subtracting signals received from said fourth and fifth multiplexing devices at said first predetermined frequency;

a sixth delay device electrically connected to an output of said second multiplexed arithmetic device, said sixth delay device arranged to delay signals received from said second multiplexed arithmetic device for a sixth predetermined number of clock cycles;

a seventh delay device electrically connected to said output of said second multiplexed arithmetic device, said seventh delay device arranged to delay signals received from said second multiplexed arithmetic device for a seventh predetermined number of clock cycles, said fifth multiplexing device electrically connected to an output of said seventh delay device and to an output of said sixth delay device for multiplexing signals received from said sixth and seventh delay devices at said first predetermined frequency;

an eighth delay device electrically connected to said output of said second multiplexed arithmetic device, said eighth delay device arranged to delay signals received from said second multiplexed arithmetic device for an eighth predetermined number of clock cycles;

an arithmetic device electrically connected to an output of said eighth delay device, said arithmetic device for squaring a value indicated by a signal received from said eighth delay device and dividing the result by the number of digital signals in the window;

a subtracting device electrically connected to an output of said arithmetic device and to said output of said second multiplexed arithmetic device, said subtracting device for subtracting a value indicated by a signal received from said second multiplexed arithmetic device from a value indicated by a signal received from said arithmetic device; and a dividing device electrically connected to an output of said subtracting device for providing a signal indicative of a variance value for the window, the variance value being equal to the result of dividing a value indicated by a signal received from said subtracting device by the number of digital signals in the window.

11. The apparatus of claim 10 wherein, said first predetermined frequency is four times a frequency at which each of said plurality of samples is received by said first delay device and said first multiplexing device; and said second predetermined frequency is two times a frequency at which each of said plurality of samples is received by said first delay device and said first multiplexing device.

12. The apparatus of claim 10 wherein, said first predetermined number of clock cycles is equal to a product of the number of digital signals in a first dimension of the window and the number of digital signals in a second dimension of the array;

said second predetermined number of clock cycles is two times the number of digital signals in the second dimension of the array;

said third predetermined number of clock cycles is equal to one;

said fourth predetermined number of clock cycles is equal to one;

said fifth predetermined number of clock cycles is two times the number of digital signals in the second dimension of the window;

said sixth predetermined number of clock cycles is equal to two;

said seventh predetermined number of clock cycles is equal to one; and said eighth predetermined number of clock cycles is equal to one.

13. The apparatus of claim 10 wherein at least one of said first, second, third, fourth, fifth, sixth, seventh, or eighth delay devices comprises a first-in first-out queue in computer memory.

14. The apparatus of claim 10 wherein said first squaring device comprises a look-up table.

* * * * *